(12) United States Patent
Ueno et al.

(10) Patent No.: US 10,320,269 B2
(45) Date of Patent: Jun. 11, 2019

(54) TRANSPORT DEVICE

(71) Applicant: HONDA MOTOR CO., LTD., Tokyo (JP)

(72) Inventors: Daisuke Ueno, Tochigi (JP); Tsutomu Ogasawara, Tochigi (JP); Keita Mitsunashi, Tochigi (JP); Hideki Shigematsu, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 55 days.

(21) Appl. No.: 15/701,552

(22) Filed: Sep. 12, 2017

(65) Prior Publication Data
US 2018/0076698 A1   Mar. 15, 2018

(30) Foreign Application Priority Data

Sep. 14, 2016   (JP) .................................. 2016-179643

(51) Int. Cl.
*B65G 57/00* (2006.01)
*H02K 15/04* (2006.01)

(52) U.S. Cl.
CPC ......... *H02K 15/0414* (2013.01); *B65G 57/00* (2013.01); *H02K 15/0421* (2013.01)

(58) Field of Classification Search
CPC . H02K 15/0414; H02K 15/0421; B65G 57/00
See application file for complete search history.

(56) References Cited

U.S. PATENT DOCUMENTS

| | | | | |
|---|---|---|---|---|
| 4,335,758 A | * | 6/1982 | Williams | ................ B21F 23/00 140/102 |
| 9,641,056 B2 | | 5/2017 | Kawano et al. | |
| 2015/0056054 A1 | * | 2/2015 | Kawano | ............ H02K 15/0414 414/788.9 |
| 2015/0074985 A1 | | 3/2015 | Ohno et al. | |

FOREIGN PATENT DOCUMENTS

| | | |
|---|---|---|
| CN | 104426307 A | 3/2015 |
| CN | 104467315 A | 3/2015 |
| DE | 552022 C * | 6/1932 ................ H01J 5/62 |
| JP | 5681249 | 3/2015 |

OTHER PUBLICATIONS

Chinese Office Action dated Mar. 21, 2019, 6 pages.

\* cited by examiner

*Primary Examiner* — Livius Radu Cazan
(74) *Attorney, Agent, or Firm* — Rankin, Hill & Clark LLP

(57) ABSTRACT

The transport device includes a backflow prevention mechanism that prevents backflow in which workpieces are moved in the direction opposite to the predetermined direction, the backflow prevention mechanism has two backflow prevention valves 810 attached to an end portion of a transport rail, and each of the backflow prevention valves 810 has an inductive plate 812 inclined with respect to the predetermined direction from the center of the transport rail to the side along the predetermined direction, and a coupling plate 813 combining a center side end portion of the inductive plate 812 positioned close to the center of the transport rail and a side surface of the transport rail.

2 Claims, 8 Drawing Sheets

US 10,320,269 B2

TRANSPORT DEVICE

This application is based on and claims the benefit of priority from Japanese Patent Application No. 2016-179643, filed on 14 Sep. 2016, the content of which is incorporated herein by reference.

BACKGROUND OF THE INVENTION

Field of the Invention

The present invention relates to a transport device for conductor wire pieces.

Related Art

Conventionally, conductor wire pieces forming a stator coil or the like are fed one by one from a conductor wire piece manufacturing device, and successively piled up to make a conductor wire piece set formed by four conductor wire pieces (for example, refer to Patent Document 1).

Patent Document 1: Japanese Patent No. 5681249

SUMMARY OF THE INVENTION

When plural conductor wire piece sets are formed by using the device described in the above patent document, the conductor wire pieces are transferred in the longitudinal direction of the conductor wire pieces and arranged on a predetermined rail. At this time, there is a concern that the conductor wire pieces collide with a wall portion on the downstream side of the transfer direction of the conductor wire pieces and bounce back to the upstream side of the transfer direction. That is, when force of feeding the conductor wire pieces is strong, the conductor wire pieces flow backward to the upstream side of the transfer direction. When the conductor wire pieces are transferred to the next process, end portions of the backflow conductor wire pieces come into contact with a part of the device, so that the conductor wire pieces may sometimes be damaged.

In consideration of such a problematic point of the conventional art, an object of the present invention is to provide a transport device in which conductor wire pieces to be transported in a predetermined direction easily come onto a rail, and even when the conductor wire pieces coming onto the rail flow backward, the conductor wire pieces do not easily come off the rail.

In order to achieve the above object, the present invention provides a transport device (for example, a conductor wire piece supply device 1 to be described later) that transports workpieces (for example, conductor wire pieces 4 to be described later) in a predetermined direction on plural transport rails (for example, a second slot portion 8a to be described later), including a backflow prevention mechanism that prevents backflow in which the workpieces are moved in the direction opposite to the predetermined direction, wherein the backflow prevention mechanism has two backflow prevention valves (for example, backflow prevention valves 810 to be described later) attached to an end portion of each of the transport rails, and each of the backflow prevention valves has an inductive plate (for example, an inductive plate 812 to be described later) inclined with respect to the predetermined direction from the center of the transport rail to the side along the predetermined direction, and a coupling plate (for example, a coupling plate 813 to be described later) combining a center side end portion of the inductive plate positioned close to the center of the transport rail and a side surface of the transport rail.

According to the present invention, the workpieces can be guided inside the backflow prevention mechanism by the inductive plates of the backflow prevention valves. Further, when the workpieces pass through the inductive plates of the backflow prevention valves, the backflow movement of the workpieces can be regulated by the existence of the coupling plates. Therefore, the workpieces can be prevented from bouncing back and flowing backward to the upstream side of the feed direction. As a result, the transport device in which the workpieces to be transported in the feed direction serving as the predetermined direction easily come onto the rail, and even when the workpieces coming onto the rail flow backward, the workpieces do not easily come off the rail can be provided.

The coupling plate has a projecting portion (for example, a projecting portion 814 to be described later) projecting on the upper side of an upper end portion of the transport rail in the height direction of the transport rail, and the projecting portion extends upward along the downstream side of the predetermined direction. Therefore, since the projecting portion extends upward along the downstream side of the predetermined direction, the workpieces can be prevented from bouncing to the upper side of the rail.

According to the present invention, the transport device in which the conductor wire pieces to be transported in the predetermined direction easily come onto the rail, and even when the conductor wire pieces coming onto the rail flow backward, the conductor wire pieces do not easily come off the rail can be provided.

DETAILED DESCRIPTION OF THE INVENTION

Figure 1:
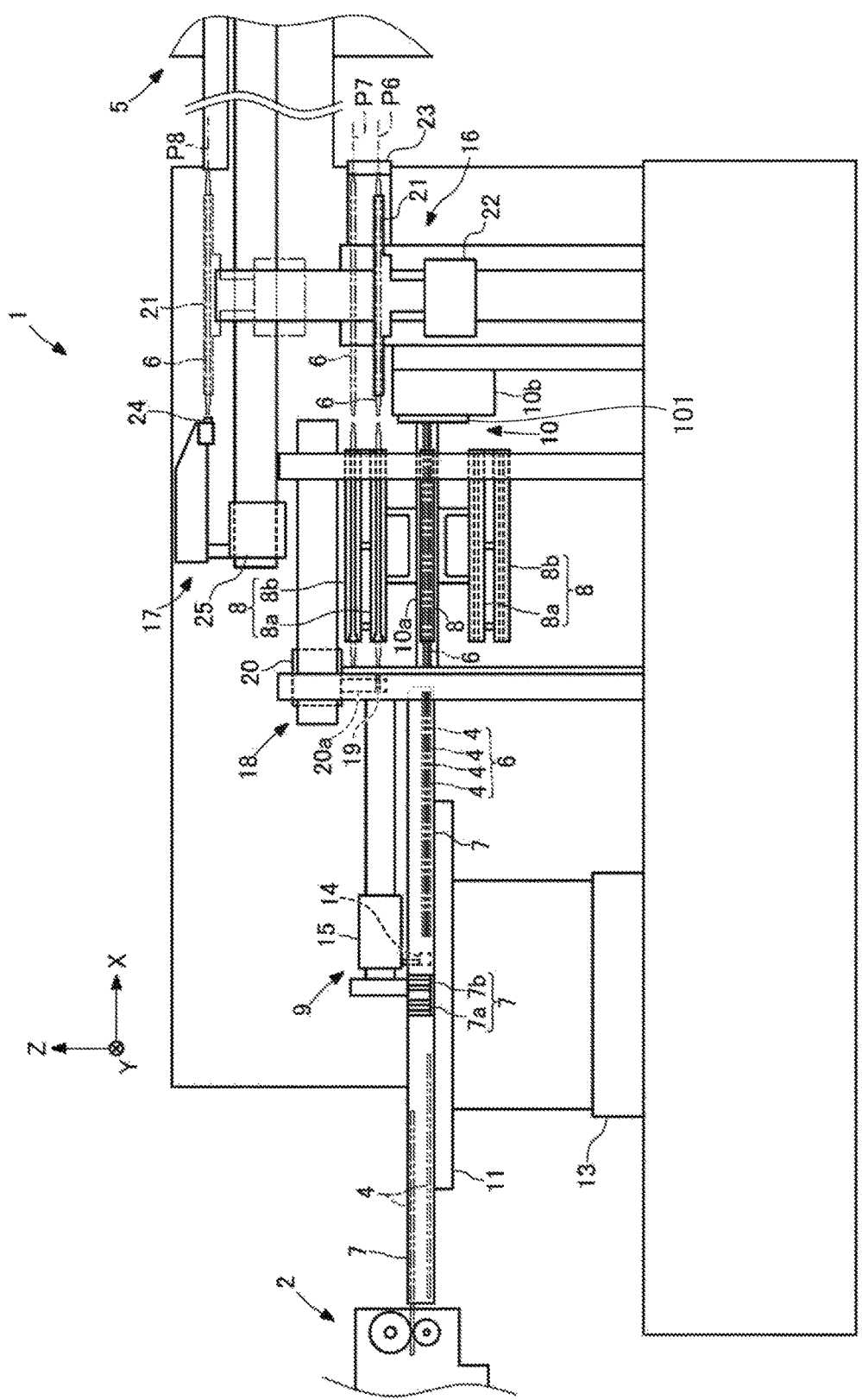
FIG. 1 is a schematic front view showing a transport device according to an embodiment of the present invention.
Figure 2:
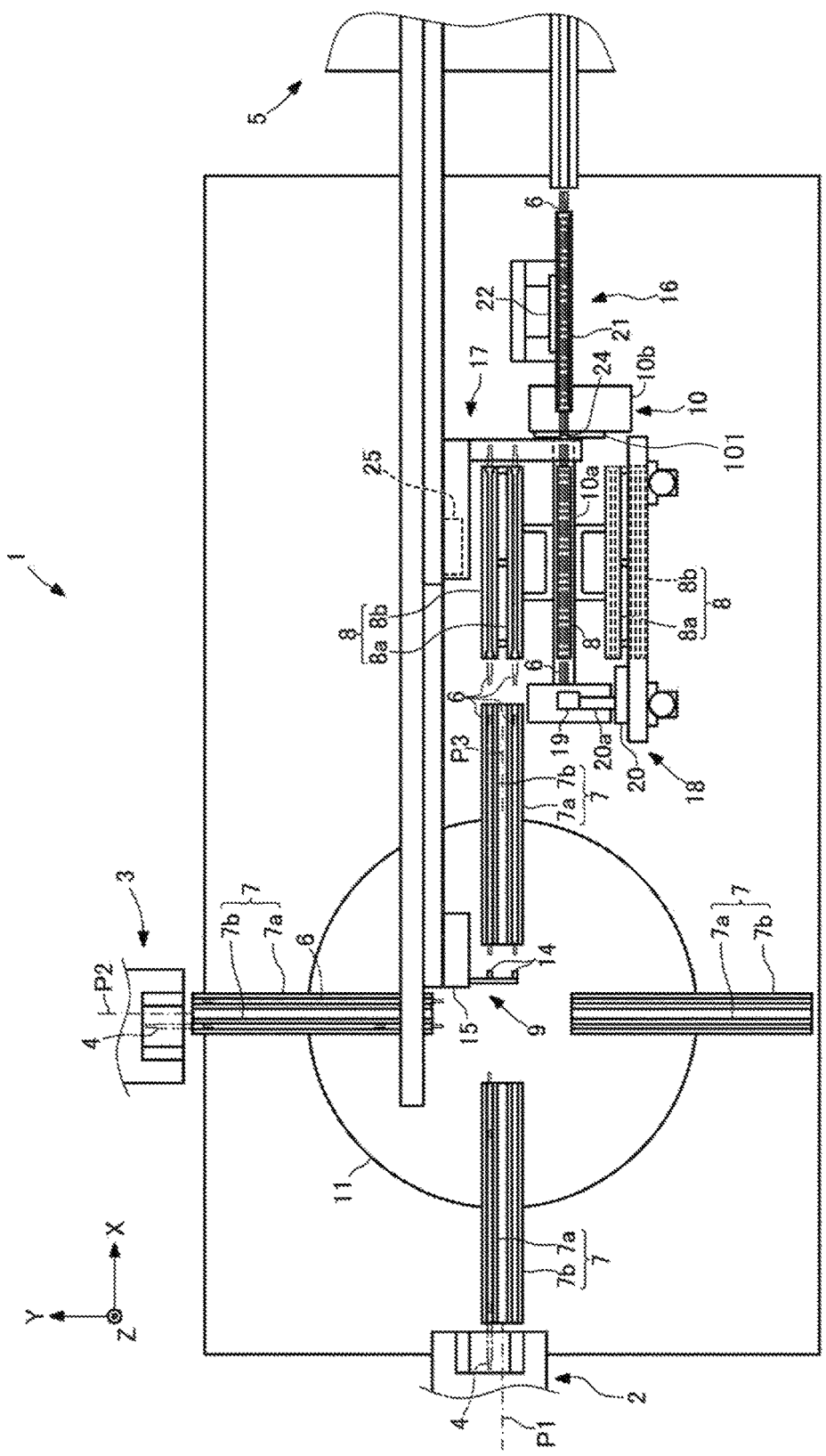
FIG. 2 is a schematic plan view showing the transport device according to the embodiment of the present invention.
Figure 3:
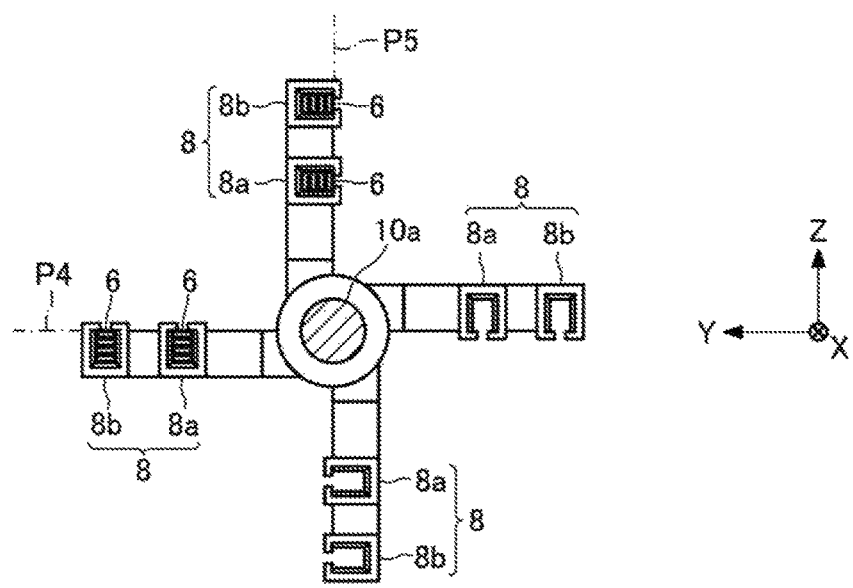
FIG. 3 is a schematic view in which second slot pairs in the transport device according to the embodiment of the present invention and a portion of a rotation shaft supporting the pairs are seen from the side of the negative direction of the X-axis.

Hereinafter, an embodiment of the present invention will be described with reference to the drawings. FIG. 1 is a schematic front view showing a transport device according to the embodiment of the present invention. FIG. 2 is a schematic plan view showing the transport device according to the embodiment of the present invention. FIG. 3 is a schematic view in which second slot pairs 8 in the transport device according to the embodiment of the present invention and a portion of a rotation shaft 10a supporting the pairs are seen from the side of the negative direction of the X-axis.

As shown in FIGS. 1 and 2, a conductor wire piece supply device 1 forms a transport device that receives and transports conductor wire pieces 4 serving as workpieces fed by two conductor wire piece manufacturing devices 2 and 3 to a forming device 5 serving as a receiving unit, and supplies the conductor wire pieces 4 to the forming device 5.

The conductor wire piece 4 is manufactured by cutting a rectangular wire provided with insulation coating to a predetermined length in the conductor wire piece manufacturing devices 2 and 3. Therefore, a section of the conductor wire piece 4 is formed in a rectangular shape, and has two surfaces at the long sides and two surfaces at the short sides. The direction perpendicular to the two surfaces at the long sides is the thickness direction of the conductor wire piece 4, and the direction perpendicular to the two surfaces at the short sides is the width direction. The insulation coating is removed from both end portions of the conductor wire piece 4.

The conductor wire pieces 4 are successively fed one by one to the conductor wire piece supply device 1 from both the conductor wire piece manufacturing devices 2 and 3. The X, Y, Z axes of the right-handed system are defined as shown in FIG. 1. The conductor wire pieces 4 are fed from the conductor wire piece manufacturing device 2 in the positive direction of the X-axis at such a posture that the longitudinal direction of the conductor wire pieces 4 matches the X axis direction, and the width direction matches the Y axis direction. The XY plane is horizontal, and the positive direction of the Z-axis matches the upward vertical direction.

The conductor wire pieces 4 are fed from the conductor wire piece manufacturing device 3 in the negative direction of the Y-axis at such a posture that the longitudinal direction of the conductor wire pieces 4 matches the Y axis direction and the width direction matches the X axis direction. In a case where the conductor wire pieces 4 are fed from either of the conductor wire piece manufacturing devices 2 and 3, four of the fed conductor wire pieces 4 are received in a pile-up manner by the conductor wire piece supply device 1.

A conductor wire piece set 6 serving as the four piled-up conductor wire pieces 4 has such a posture that the thickness direction of the conductor wire pieces 4 matches the Z axis direction (vertical direction). This posture is converted into such a posture that the width direction of the conductor wire pieces 4 matches the Z axis direction, and the conductor wire piece set is supplied to the forming device 5. The conductor wire piece set 6 to be supplied to the forming device 5 is formed into a substantially U shape in the forming device 5, and supplied for formation of a stator coil.

As shown in FIGS. 1 and 2, the conductor wire piece supply device 1 includes four first slot pairs 7 for receiving the conductor wire pieces 4 from the conductor wire piece manufacturing devices 2 and 3, the four second slot pairs 8 corresponding to these slot pairs, a transfer unit 9 that transfers the conductor wire piece sets 6 in each of the first slot pairs 7 to the corresponding second slot pair 8, and a rotation unit 10 that rotates the second slot pairs 8 as major constituent elements.

The first slot pair 7 is formed by the first slot portions 7a and 7b serving as two transport rails adjacent to each other in parallel. Each of the first slot portions 7a and 7b includes a slot groove whose leading end side is opened for receiving the conductor wire pieces 4. The conductor wire pieces 4 are received from the leading end sides of the first slot portions 7a and 7b.

The first slot pairs 7 are arranged on a rotation table 11 whose table top is parallel to the XY plane. The first slot pair 7 extends along the radial direction of the rotation table 11 and is at an angle of 90 degrees with respect to the other first slot pairs. Radially outer side (leading end side) end portions of the first slot portions 7a and 7b are positioned on the same circumference of a circle with the rotation axis of the rotation table 11 as its center.

At a feed position where the conductor wire pieces 4 are fed one by one from the conductor wire piece manufacturing device 2, by the first slot portion 7a successively piling up and receiving the conductor wire pieces 4, the conductor wire piece set 6 is formed by the four conductor wire pieces 4.

At a feed position where the conductor wire pieces 4 are fed one by one from the conductor wire piece manufacturing device 3, by the first slot portion 7b successively piling up and receiving the conductor wire pieces 4, the conductor wire piece set 6 is formed by the four conductor wire pieces 4.

Below the rotation table 11, a rotation drive unit 13 that rotates the rotation table 11 about the rotation axis in the vertical direction of the rotation table is provided. The rotation drive unit 13 rotates the rotation table 11 by 90 degrees at a time in such a manner that each of the first slot pairs 7 is placed in parallel to the X axis and successively positioned at a first position P1 to face the conductor wire piece manufacturing device 2.

The direction of rotation is the rotation direction of a right-handed screw when advancing in the negative direction of the Z-axis. By this rotation, each of the first slot pairs 7 is placed parallel to the Y axis and successively positioned at a second position P2 to face the conductor wire piece manufacturing device 3. By this rotation, the first slot pair 7 is successively positioned at a third position P3 serving as a position on the opposite side of the first position P1 on the rotation table 11.

One conductor wire piece manufacturing device 2 is arranged at a position where the conductor wire pieces 4 can be fed to the first slot portion 7a of the first slot pair 7 positioned at the first position P1. Another conductor wire piece manufacturing device 3 is arranged at a position where the conductor wire pieces 4 can be successively fed to the first slot portion 7b of the first slot pair 7 positioned at the second position P2.

Each of the second slot pairs 8 is formed by second slot portions 8a and 8b parallel to each other. Each of the second slot portions 8*a* and 8*b* includes a slot groove 801 with both ends being opened for receiving the conductor wire piece sets 6.

The interval between the slot grooves 801 of the second slot portions 8*a* and 8*b* in the second slot pair 8 is the same as the interval between the slot grooves of the first slot portions 7*a* and 7*b* in the first slot pair 7. The conductor wire piece sets 6 are transferred to the second slot portions 8*a* and 8*b* of the second slot pair 8 from the first slot portions 7*a* and 7*b* of the corresponding first slot pair 7.

The rotation unit 10 includes a rotation shaft 10*a* supporting the four second slot pairs 8, and a drive means 10*b* that rotates the rotation shaft 10*a*. The rotation shaft 10*a* supports the four second slot pairs 8 in such a manner that the second slot pairs 8 are placed parallel to the rotation shaft 10*a* at equal distances from the rotation shaft 10*a* and at equal intervals (at 90-degree center angle intervals with the center axis of the rotation shaft 10*a* as center).

As shown in FIGS. 1 and 2, the second slot portions 8*a* and 8*b* of the second slot pair 8 are arranged in such a manner that the second slot portion 8*a* is positioned closer to the center axis than the second slot portion 8*b* on a plane parallel to the plane including the center axis of the rotation shaft 10*a*.

The rotation unit 10 rotates the four second slot pairs 8 by 90 degrees at a time. The rotation direction of the four second slot pairs 8 is the direction in which a right-handed screw is rotated when advancing in the positive direction of the X-axis. Thereby, as shown in FIG. 3, the second slot pair 8 is rotated about the rotation shaft 10*a* so as to be successively positioned at a fourth position P4 serving as a position in the positive direction of the Y-axis with respect to the center axis of the rotation shaft 10*a*, and at a fifth position P5 serving as a position further rotated by 90 degrees from this fourth position P4.

An abutment member 101 is provided on the side of the positive direction of the X-axis of a portion facing the second slot pair 8 in the drive means 10*b*. When the conductor wire piece sets 6 are fed from the first slot portions 7*a* and 7*b* to the second slot portions 8*a* and 8*b*, the abutment member 101 is abutted with the right ends of the four conductor wire pieces 4 forming each of the conductor wire piece sets 6 to make the positions of the right ends the same.

As shown in FIG. 2, the position of the rotation unit 10 is set in such a manner that the second slot pair 8 positioned at the fourth position P4 is positioned in the same straight line with the first slot pair 7 positioned at the third position P3. The transfer unit 9 includes a first feed member 14 for pushing and feeding the conductor wire piece sets 6 in the first slot portions 7*a* and 7*b* of the first slot pair 7 positioned at the third position P3 from the side of the negative direction of the X-axis, and a first stage 15 that supports and moves the first feed member 14 in the X axis direction with a linear motor.

By moving the first feed member 14 with the first stage 15, the transfer unit 9 respectively inserts the conductor wire piece sets 6 in the first slot portions 7*a* and 7*b* of the first slot pair 7 positioned at the third position P3 into the second slot portions 8*a* and 8*b* of the second slot pair 8 positioned at the fourth position P4.

Between the rotation unit 10 and the forming device 5, a raising and lowering unit 16 is provided that receives the conductor wire piece sets 6 forwarded from the second slot portions 8*a* and 8*b* of the second slot pair 8 positioned at the fifth position P5 and raises the conductor wire piece sets to a predetermined eighth position P8. The conductor wire piece sets 6 raised to the eighth position P8 are supplied to the forming device 5 by a supply unit 17.

The conductor wire piece sets 6 are forwarded from the second slot portions 8*a* and 8*b* to the raising and lowering unit 16 by a forwarding unit 18. The forwarding unit 18 includes a second feed member 19 for pushing and feeding the conductor wire piece sets 6 in the second slot portions 8*a* and 8*b* of the second slot pair 8 positioned at the fifth position P5 from the side of the negative direction of the X-axis, and a second stage 20 that supports and moves the second feed member 19 in the X axis direction with a linear motor.

A displacement means 20*a* that displaces the second feed member 19 in the Z axis direction is provided in the second stage 20. The displacement means 20*a* positions the second feed member 19 at a predetermined upper or lower position in such a manner that the conductor wire piece sets 6 in the second slot portions 8*a* and 8*b* are separately fed by the second feed member 19 to the raising and lowering unit 16 at a different timing.

That is, the second feed member 19 is positioned at the lower position corresponding to the position of the second slot portion 8*a* in a case where the conductor wire piece set 6 in the second slot portion 8*a* is fed, and positioned at the upper position corresponding to the position of the second slot portion 8*b* in a case where the conductor wire piece set 6 in the second slot portion 8*b* is fed.

The raising and lowering unit 16 includes a third slot portion 21 that receives the conductor wire piece set 6 fed from the second slot portion 8*a* or 8*b* of the second slot pair 8 positioned at the fifth position P5, and a third stage 22 that supports and raises or lowers the third slot portion 21 with a linear motor.

A slot with both ends being opened for receiving the conductor wire piece set 6 is provided in the third slot portion 21. By raising or lowering the third stage 22, the raising and lowering unit 16 positions the third slot portion 21 at a sixth position P6, a seventh position P7, and the eighth position P8.

The sixth position P6 is a position where the third slot portion 21 is placed on the side of the positive direction of the X-axis in the same straight line with the second slot portion 8*a* of the second slot pair 8 positioned at the fifth position P5. The seventh position P7 is a position where the third slot portion 21 is placed on the side of the positive direction of the X-axis in the same straight line with the second slot portion 8*b* of the second slot pair 8 positioned at the fifth position P5. The eighth position P8 is a position where the conductor wire piece set 6 is fed from the third slot portion 21 to the forming device 5.

The third slot portion 21 positioned at the sixth position P6 can receive the conductor wire piece set 6 fed from the second slot portion 8*a* of the second slot pair 8 positioned at the fifth position P5. The third slot portion 21 positioned at the seventh position P7 can receive the conductor wire piece set 6 fed from the second slot portion 8*b* of the second slot pair 8 positioned at the fifth position P5.

An abutment member 23 is provided on the side of the positive direction of the X-axis of a portion corresponding to the sixth position P6 and the seventh position P7 in the raising and lowering unit 16. When the conductor wire piece sets 6 are fed from the second slot portions 8*a* and 8*b* to the raising and lowering unit 16, the abutment member 23 is abutted with the right ends of the four conductor wire pieces 4 forming each of the conductor wire piece sets 6 to make the positions of the right ends the same.

The supply unit 17 includes a third feed member 24 for pushing and feeding the conductor wire piece set 6 in the third slot portion 21 positioned at the eighth position P8 by the raising and lowering unit 16 from the side of the negative direction of the X-axis, and a fourth stage 25 that supports and moves the third feed member 24 in the X axis direction with a linear motor. By moving the third feed member 24 using the fourth stage 25, the supply unit 17 can feed the conductor wire piece set 6 in the third slot portion 21 to the forming device 5.

Figure 4:
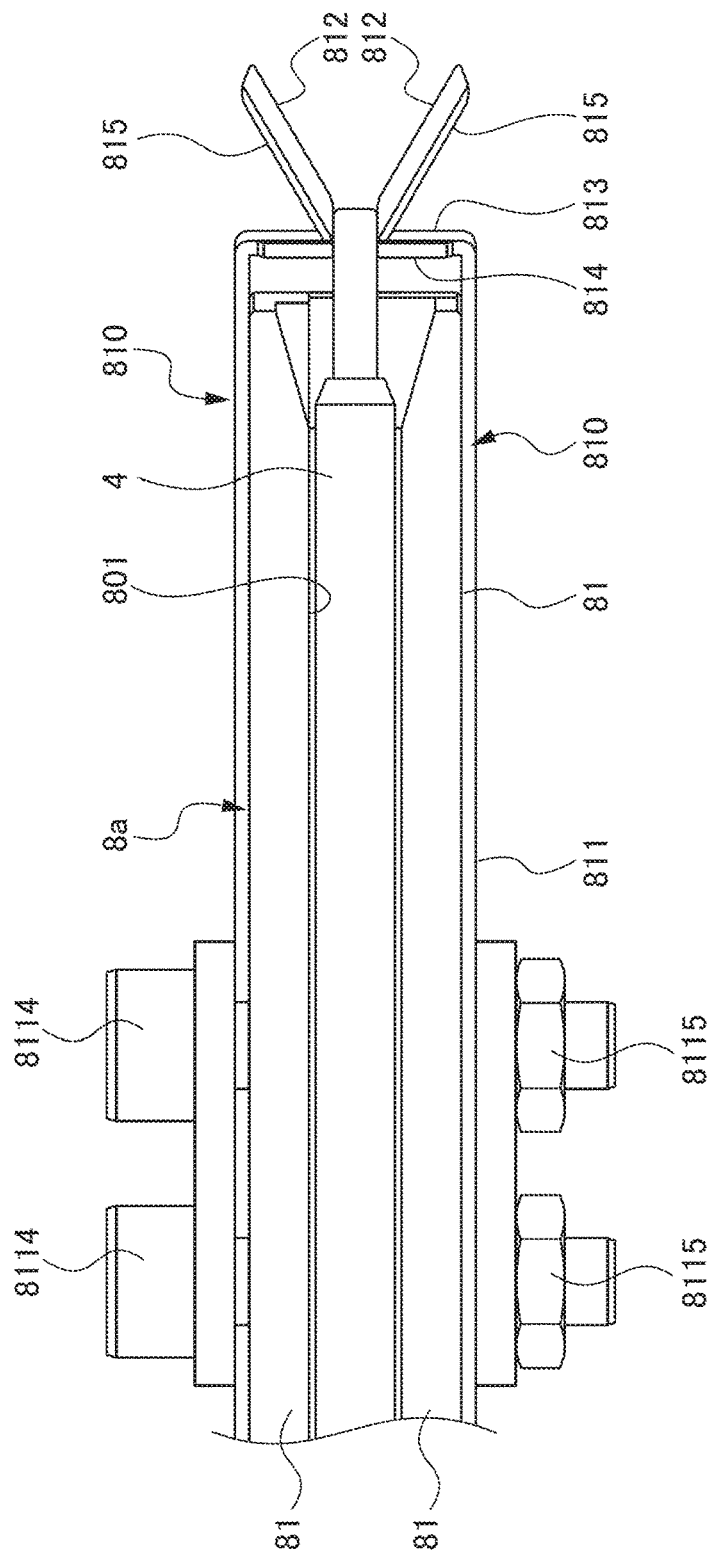
FIG. 4 is a plan view showing a second slot portion of the transport device according to the embodiment of the present invention, and conductor wire pieces.
Figure 5:
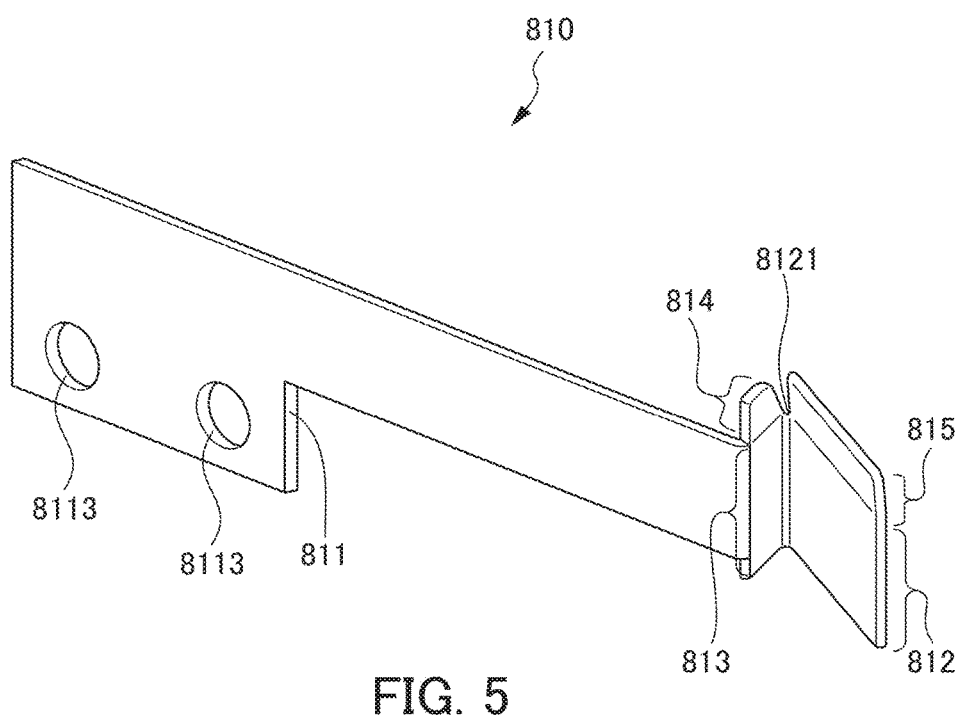
FIG. 5 is a perspective view showing a backflow prevention valve of the transport device according to the embodiment of the present invention.
Figure 6:
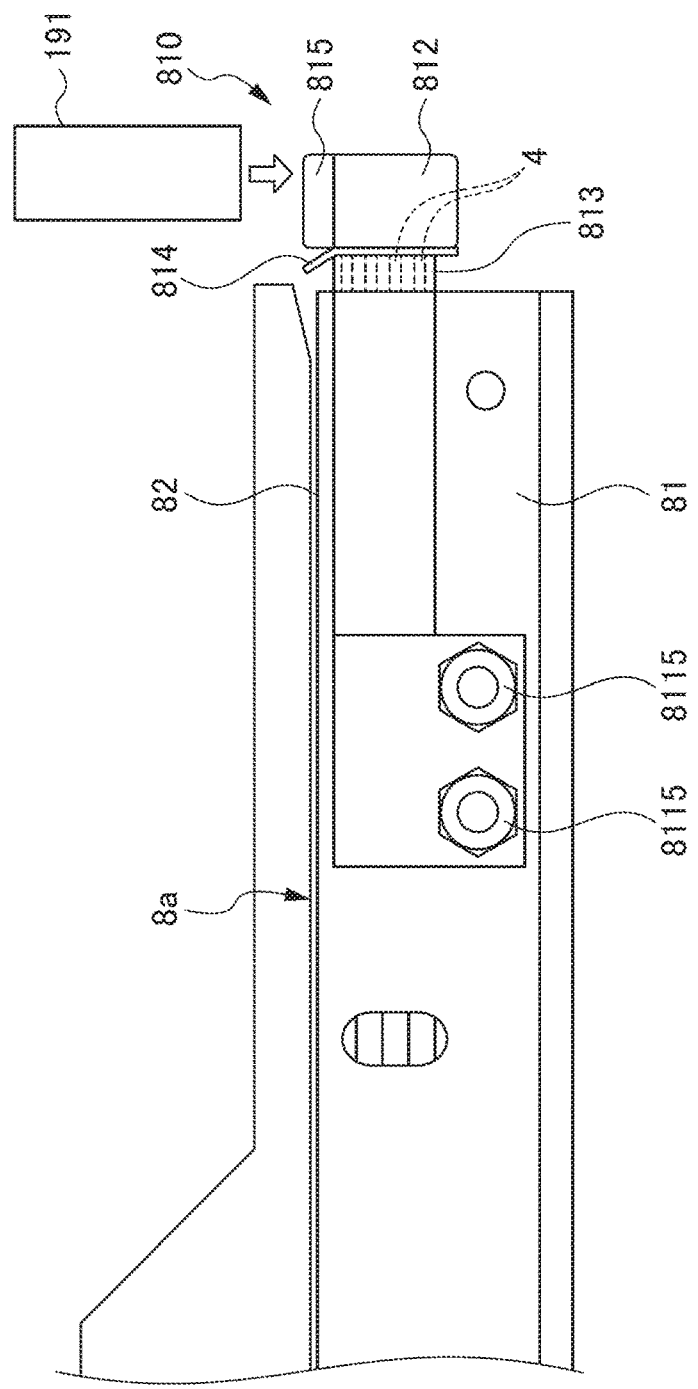
FIG. 6 is a side view showing a claw portion of a second feed member that feeds the conductor wire pieces to the second slot portion of the transport device according to the embodiment of the present invention.

Next, a backflow prevention mechanism will be described in detail. FIG. 4 is a plan view showing the second slot portion 8a of the transport device according to the embodiment of the present invention, and the conductor wire pieces 4. FIG. 5 is a perspective view showing a backflow prevention valve 810 of the transport device according to the embodiment of the present invention. FIG. 6 is a side view showing a claw portion 191 of the second feed member that feeds the conductor wire pieces 4 to the second slot portion 8a of the transport device according to the embodiment of the present invention.

The backflow prevention mechanism prevents backflow in which the conductor wire pieces 4 are moved in the direction opposite to the predetermined direction in which the conductor wire pieces 4 are transported. Specifically, the backflow prevention mechanism has two backflow prevention valves 810. Two backflow prevention valves 810 are provided in each of the first slot portions 7a and 7b of the first slot pair 7, the second slot portions 8a and 8b of the second slot pair 8, and the third slot portion 21. All the backflow prevention valves 810 have the same configuration. Thus, hereinafter, the backflow prevention valves 810 provided in the second slot portion 8a will be described, and a description of the other backflow prevention valves will be omitted. The two backflow prevention valves 810 have a symmetrical form with respect to the slot groove 801. Thus, the backflow prevention valve 810 on one side will be described, and a description of the backflow prevention valve 810 on the other side will be omitted.

As shown in FIG. 5, the backflow prevention valve 810 is formed by bending a plate shaped metal member, and has a substrate portion 811, an inductive plate 812, a coupling plate 813, a projecting portion 814, and an upper extended width portion 815. The substrate portion 811 has a substantially oblong shape extending in the predetermined direction in which the conductor wire pieces 4 are transported (which is the positive direction of the X-axis, and hereinafter, referred to as the "feed direction"). Two through holes 8113 are formed along the feed direction in an upstream side end portion of the substrate portion 811 in the feed direction. Bolts 8114 (refer to FIG. 4) respectively pass through the through holes 8113, and the substrate portion 811 is fixed to a side surface 81 of an end portion on the downstream side of the feed direction of the second slot portion 8a using the bolts 8114 and nuts 8115. Thereby, the backflow prevention valve 810 is fixed and attached to the end portion on the downstream side of the feed direction of the second slot portion 8a. A portion of the substrate portion 811 on the downstream side of the feed direction of the portion where the through holes 8113 are formed is formed to have a narrower width in the Z axis direction, and extends up to the end portion of the second slot portion 8a on the downstream side of the feed direction, and is integrally connected to one end portion of the coupling plate 813.

Figure 7:
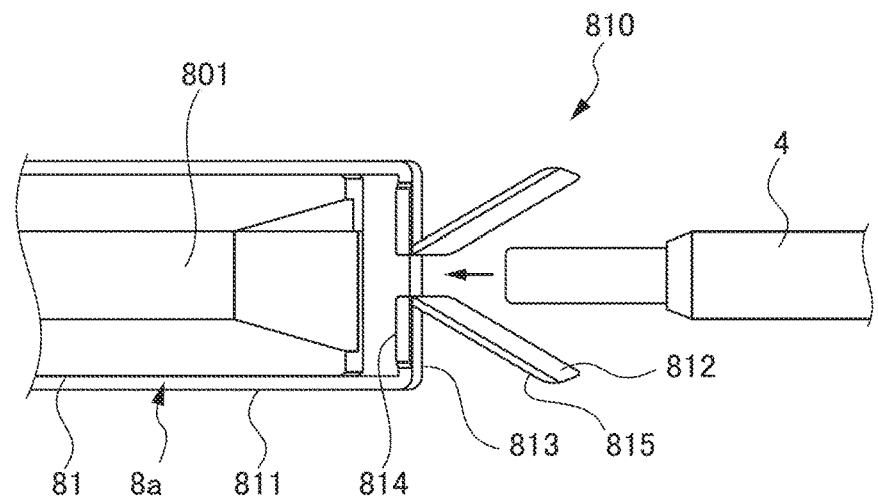
FIG. 7 is a plan view showing a state where end portions of the conductor wire pieces are about to collide with inductive plates of the backflow prevention valves of the transport device according to the embodiment of the present invention.

The coupling plate 813 has a substantially oblong flat plate shape, and extends from the substrate portion 811 up to the vicinity of the center position of the slot groove 801 in the direction orthogonal to the feed direction. That is, the coupling plate 813 combines a center side end portion 8121 of the inductive plate 812 to be described later, and the side surface 81 of the second slot portion 8a to which the substrate portion 811 is fixed. The other end portion of the coupling plate 813 is integrally connected to the upstream side end portion in the feed direction (center side end portion 8121) of the inductive plate 812. The distance between the other end portion of the coupling plate 813 of the backflow prevention valve 810 on the one side among the two backflow prevention valves 810, and the other end portion of the coupling plate 813 of the backflow prevention valve 810 on the other side, that is, the distance between the left ends of the pair of inductive plates 812 shown in FIG. 7 is shorter than the width of the end portions of the conductor wire pieces 4 from which the insulation coating is removed. The projecting portion 814 is integrally connected to an upper end portion of the coupling plate 813, and as shown in FIG. 6, projects to the upper side of an upper end portion 82 of the second slot portion 8a in the height direction of the second slot portion 8a (Y axis direction). The projecting portion 814 extends obliquely upward and toward the upstream side of the feed direction. That is, the projecting portion 814 has a plate shape extending upward and toward the downstream side of the feed direction.

The inductive plate 812 has a substantially oblong shape. The other end portion of the coupling plate 813 is integrally connected to the inductive plate 812. The end portion of the inductive plate 812 on the upstream side of the feed direction forms the center side end portion 8121 of the inductive plate 812 positioned close to the center of the second slot portion 8a. The inductive plate 812 is inclined with respect to the feed direction from the center of the second slot portion 8a in the width direction of the slot groove 801 toward the side of the second slot portion 8a along the upstream side of the feed direction. More specifically, the inductive plate 812 extends toward the upstream side of the feed direction so as to gradually go away from the center position of the slot groove 801, that is, as shown in FIG. 4, to form such a tapered shape that width is extended toward the upstream side of the feed direction by the inductive plates 812 of the two backflow prevention valves 810. The width between the inductive plates 812 of the two backflow prevention valves 810 in the most extended width portion of the tapered shape is substantially equal to the width of the second slot portion 8a in the direction orthogonal to the feed direction, which is the direction matching the width direction of the slot groove 801.

Figure 8:
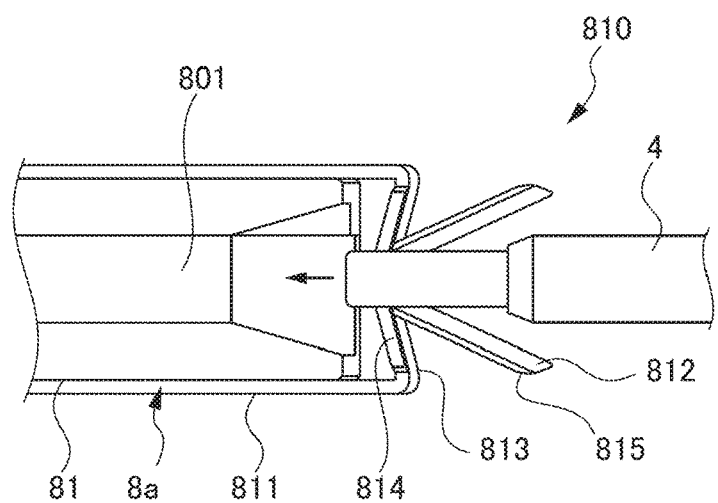
FIG. 8 is a plan view showing a state where the end portions of the conductor wire pieces 4 start coming into a slot groove 801 of the transport device according to the embodiment of the present invention.

The upper extended width portion 815 is integrally connected to the upper end portion of the inductive plate 812. The upper extended width portion 815 has a substantially oblong flat plate shape, and extends upward from the upper end portion of the inductive plate 812 so as to go away from the center position of the slot groove 801. Therefore, as shown in FIG. 4, in the width direction of the slot groove 801, the upper extended width portions 815 of the two backflow prevention valves 810 extend the width so as to open up and down on becoming closer to the near side of the paper plane of FIG. 4 from the inductive plates 812. The inductive plate 812, the coupling plate 813, the projecting portion 814, and the upper extended width portion 815 can be elastically deformed as a whole as shown in FIG. 8 to be described later.

Figure 9:
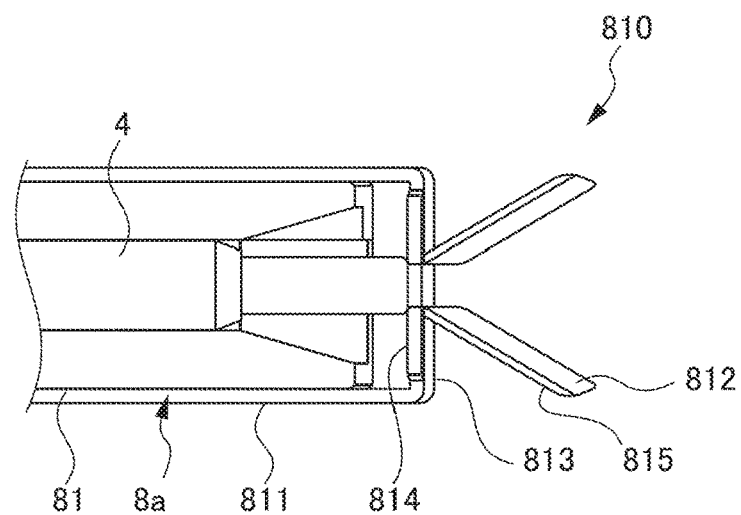
FIG. 9 is a plan view showing a state where the end portions of the conductor wire pieces collide with the coupling plates of the backflow prevention valves of the transport device according to the embodiment of the present invention.
Figure 10:
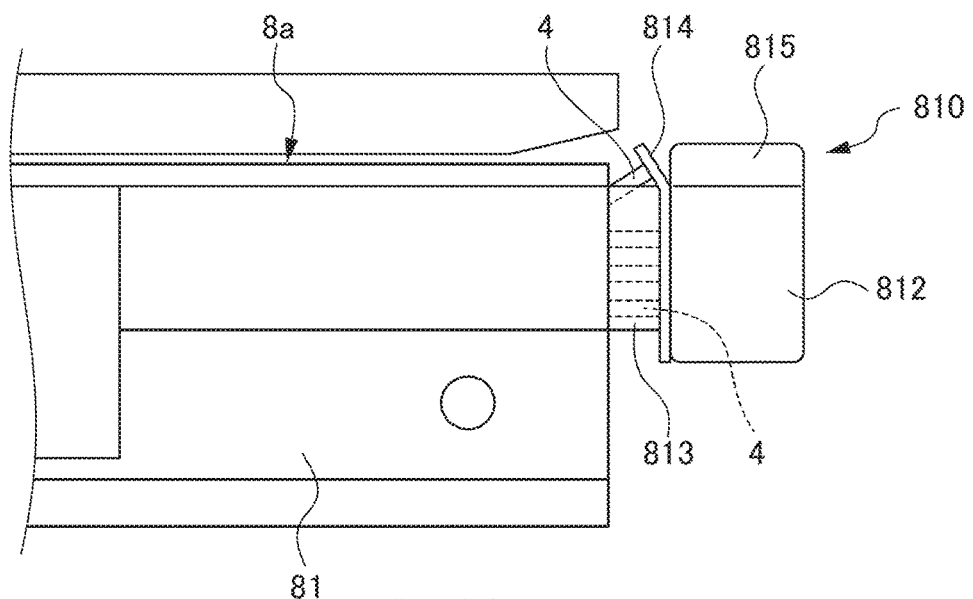
FIG. 10 is a schematic side view showing a state where the end portions of the conductor wire pieces collide with projecting portions of the backflow prevention valves of the transport device according to the embodiment of the present invention.

Next, the actions of transporting the conductor wire pieces 4 in the feed direction and arranging the conductor wire pieces in the slot groove 801 of the second slot portion 8a are described. FIG. 7 is a plan view showing a state where the end portions of the conductor wire pieces 4 are about to collide with the inductive plates 812 of the backflow prevention valves 810 of the transport device according to the embodiment of the present invention. FIG. 8 is a plan view showing a state where the end portions of the conductor wire pieces 4 start coming into the slot groove 801 of the transport device according to the embodiment of the present invention. FIG. 9 is a plan view showing a state where the end portions of the conductor wire pieces 4 collide with the coupling plates 813 of the backflow prevention valves 810 of the transport device according to the embodiment of the present invention. FIG. 10 is a schematic side view showing a state where the end portions of the conductor wire pieces 4 collide with the projecting portions 814 of the backflow prevention valves 810 of the transport device according to the embodiment of the present invention.

Firstly, the conductor wire pieces 4 are arranged in the slot groove of the first slot portion 7a (refer to FIG. 1 and the like). The second feed member 19 is displaced by the displacement means 20a, and as shown in FIG. 6, the claw portion 191 of the second feed member 19 is inserted into a part between the upper extended width portions 815 of the two backflow prevention valves 810. At this time, the width between the upper extended width portions 815 of the two backflow prevention valves 810 in the width direction of the slot groove 801 is extended so as to open along the upper side as described above. Thus, the claw portion 191 of the second feed member 19 (refer to FIG. 6) can readily come into the part between the upper extended width portions 815 of the two backflow prevention valves 810, and is guided to a part between the inductive plates 812 of the two backflow prevention valves 810 by the upper extended width portions 815.

The end portions of the conductor wire pieces 4 guided to the part between the inductive plates 812 of the two backflow prevention valves 810 are transported in the feed direction by the claw portion 191 of the second feed member 19, and fed into the slot groove 801 of the second slot portion 8a. At this time, the inductive plates 812 of the two backflow prevention valves 810 form such a tapered shape that the width is extended toward the upstream side of the feed direction. Thus, as shown in FIG. 7, by being abutted with the inductive plates 812, the conductor wire pieces 4 are guided by the inductive plates 812 to reach the left ends of the pair of inductive plates 812 shown in FIG. 7. As described above, the distance between the left ends of the pair of inductive plates 812 shown in FIG. 7 is shorter than the width of the end portions of the conductor wire pieces 4 from which the insulation coating is removed. Thus, as shown in FIG. 8, a part between the left ends of the pair of inductive plates 812 is pushed out by the end portions of the conductor wire pieces 4, and the end portions of the conductor wire pieces 4 are readily introduced into the slot groove 801. Thereby, the width between the left ends of the pair of inductive plates 812 pushed out by the end portions of the conductor wire pieces 4 is returned to be the original width as shown in FIG. 9. The conductor wire pieces 4 swiftly collide with the abutment member 101 (refer to FIG. 1 and the like) positioned on the downstream side of the feed direction of the second slot portion 8a, and bounce back to the upstream side of the feed direction and flow backward. At this time, the end portions of the conductor wire pieces 4 on the upstream side of the feed direction collide with the other end portions of the coupling plates 813 as shown in FIG. 9. Thereby, the conductor wire pieces 4 are prevented from flowing backward to the upstream side of the feed direction of the coupling plates 813.

In a case where the end portions of the conductor wire pieces 4 on the upstream side of the feed direction are to flow backward toward the upper side of the upstream side of the feed direction, the end portions of the conductor wire pieces 4 collide with the projecting portions 814 as shown in FIG. 10. As described above, the projecting portions 814 have a plate shape extending upward and toward the downstream side of the feed direction. Thus, the conductor wire pieces 4 are prevented from flowing backward and further the end portions of the conductor wire pieces 4 are prevented from bouncing upward.

According to the present embodiment, the following effects are exerted.

In the present embodiment, the transport device (conductor wire piece supply device 1) that transports the conductor wire pieces 4 serving as workpieces in the predetermined direction into the slot groove 801 of the second slot portion 8a serving as plural transport rails includes the backflow prevention mechanism that prevents backflow in which the conductor wire pieces 4 are moved in the direction opposite to the predetermined direction. The backflow prevention mechanism has the two backflow prevention valves 810 attached to the end portion of the second slot portion 8a. The backflow prevention valve 810 has the inductive plate 812 inclined with respect to the predetermined direction from the center of the second slot portion 8a toward the side along the predetermined direction, and the coupling plate 813 combining the center side end portion 8121 of the inductive plate 812 positioned close to the center of the second slot portion 8a and the side surface 81 of the second slot portion 8a.

Thereby, by the inductive plates 812 of the backflow prevention valves 810, the conductor wire pieces 4 serving as workpieces are guided inside the backflow prevention mechanism, that is, to the smallest width portion between the inductive plates 812 of the two backflow prevention valves 810, so that the conductor wire pieces can be guided into the slot groove 801. Further, when the conductor wire pieces 4 pass through the part between the inductive plates 812 of the two backflow prevention valves 810 and come into the slot groove 801, backflow movement of the conductor wire pieces 4 can be regulated by the existence of the coupling plates 813. Therefore, the conductor wire pieces 4 can be prevented from bouncing back and flowing backward to the upstream side of the feed direction. As a result, the transport device (conductor wire piece supply device 1) can be provided in which the conductor wire pieces 4 to be transported in the feed direction serving as the predetermined direction easily come into the slot groove 801 of the second slot portion 8a serving as a rail, and even when the conductor wire pieces 4 coming into the slot groove 801 of the second slot portion 8a flow backward, the conductor wire pieces do not easily come out of the slot groove of the second slot portion 8a.

The coupling plate 813 has the projecting portion 814 projecting on the upper side of the upper end portion of the second slot portion 8a in the height direction of the second slot portion 8a. The projecting portions 814 extend upward along the downstream side of the predetermined direction.

Therefore, since the projecting portions 814 extend upward along the downstream side of the predetermined direction, the conductor wire pieces 4 can be prevented from bouncing to the upper side of the second slot portion 8a serving as a rail.

The present invention is not limited to the above embodiment but modifications, improvements, and the like within the range in which the object of the present invention can be achieved are included in the present invention. For example, although workpieces are the conductor wire pieces 4 in the present embodiment, the present invention is not limited to the conductor wire pieces 4. The configuration of the backflow prevention valve is not limited to the configuration of the backflow prevention valve 810 in the present embodiment. That is, although the backflow prevention valve 810 has the substrate portion 811, the inductive plate 812, the coupling plate 813, the projecting portion 814, and the upper extended width portion 815, the present invention is not limited to this configuration.

EXPLANATION OF REFERENCE NUMERALS

1: Conductor wire piece supply device
4: Conductor wire piece
8a: Second slot portion
81: Side surface
810: Backflow prevention valve
812: Inductive plate
813: Coupling plate
814: Projecting portion

What is claimed is:

1. A transport device that transports workpieces in a predetermined direction on plural transport rails, comprising:
 a backflow prevention mechanism that prevents backflow in which the workpieces are moved in the direction opposite to the predetermined direction, wherein
 the backflow prevention mechanism has two backflow prevention valves attached to an end portion of each of the transport rails, and
 each of the backflow prevention valves has:
 an inductive plate inclined with respect to the predetermined direction from the center of the transport rail to the side along the predetermined direction; and
 a coupling plate combining a center side end portion of the inductive plate positioned close to the center of the transport rail and a side surface of the transport rail.

2. The transport device according to claim 1, wherein the coupling plate has a projecting portion projecting on the upper side of an upper end portion of the transport rail in the height direction of the transport rail, and
 the projecting portion extends upward along the downstream side of the predetermined direction.

* * * * *